UNITED STATES PATENT OFFICE.

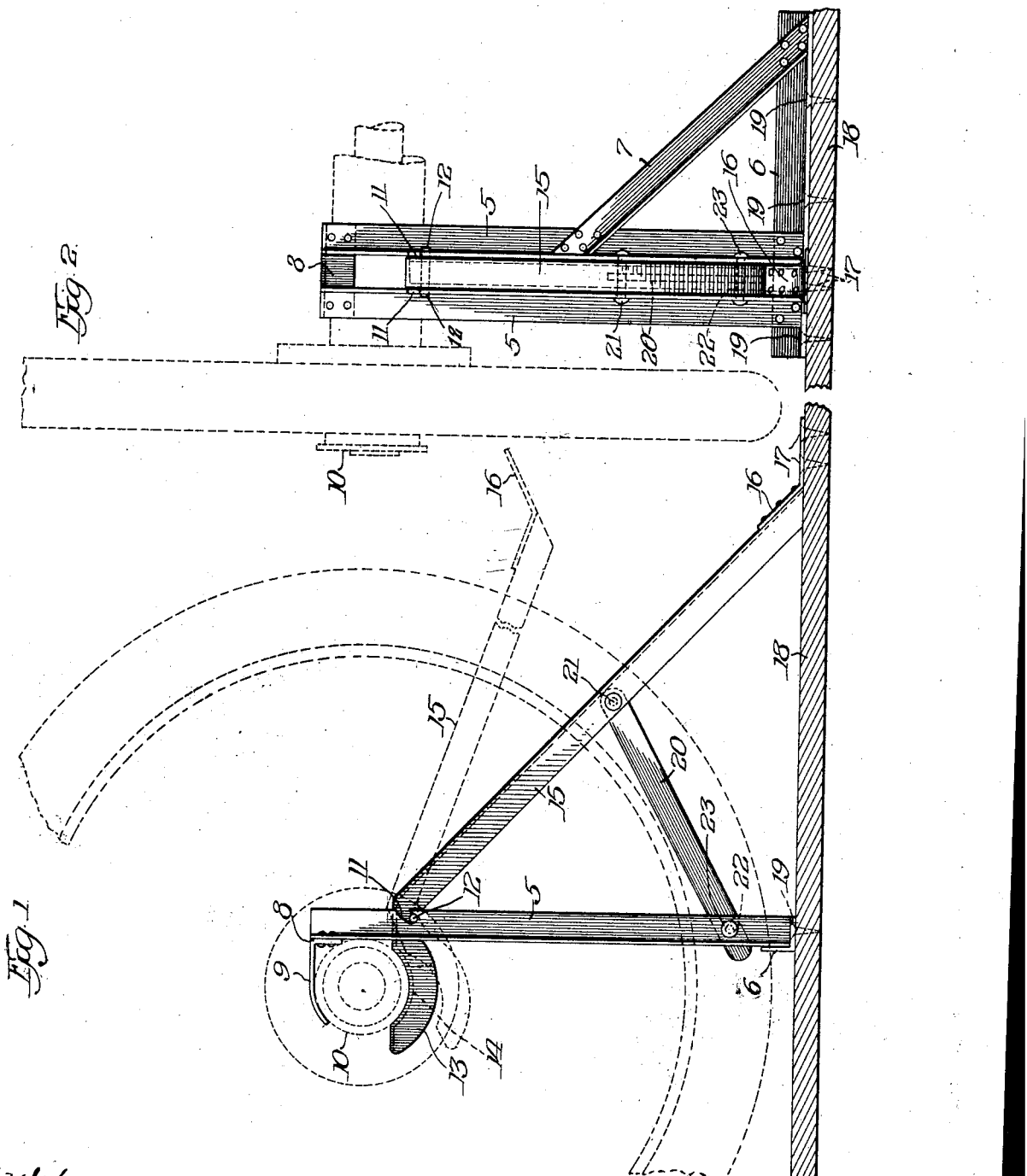

PHILIP DERROW, OF CHICAGO, ILLINOIS.

AUTOMOBILE-SUPPORT.

1,384,798.  Specification of Letters Patent.  Patented July 19, 1921.

Application filed February 5, 1921. Serial No. 442,663.

*To all whom it may concern:*

Be it known that I, PHILIP DERROW, a citizen of the United States, residing at Chicago, in the county of Cook and State of Illinois, have invented certain new and useful Improvements in Automobile-Supports, of which the following is a specification.

This invention relates to a device in the nature of a support or rest for automobiles in situations where it is necessary or desirable to take the weight of the vehicle off the tires and at the same time securely anchor the vehicle against movement, such, for instance, as in shipping automobiles in railway cars, or storing cars in garages for considerable periods of time when they are not in use. Heretofore, so far as I am aware, it has been the usual practice to employ blocks of wood and pieces of plank usually nailed to the floor, to support the car with the weight removed from the tires and to block the car against accidental movement, and this practice involves the waste of a considerable amount of valuable lumber.

One purpose or object of the present invention is to dispense with this waste of lumber, and provide a simple, inexpensive and practical device which may be employed for this purpose and which shall be capable of indefinite re-use. Another object of the invention is to provide a device of the character specified, which in its application to a car, may also serve the function of an ordinary automobile jack for raising the axles of the car sufficiently to take the weight off the tires. A still further object of the invention is to provide a device of the character specified which shall consist of but few simple parts and which may be knocked down or collapsed and stored when not in use in a minimum of space.

These and other objects and advantages of the invention will be apparent to persons familiar with devices of this general character from the following detailed description, taken in connection with the accompanying drawings in which I have illustrated one practical embodiment of the invention and wherein—

Figure 1 is a side elevation of my improved automobile support, shown as applied to the rear axle of an automobile; and Fig. 2 is a rear view of the same, as seen from the right of Fig. 1.

Referring to the drawing, 5 designates each of a pair of spaced vertical angle bars which unitedly constitute a vertical standard; the angle bars 5 being stepped upon and secured to a horizontal angle bar 6 which constitutes a foot for the vertical standard. As seen in Fig. 2 the foot 6 extends to a considerable distance to one side of the lower end of the standard 5 and is connected to the latter by a diagonal angle bar brace 7. At their upper ends the vertical angle bars 5 are rigidly connected by a transverse brace 8, from the upper end of which preferably extends a hook 9 adapted to overhang the axle indicated at 10.

In the rear edges of the spaced angle-bars 5 are formed a pair of notches 11, the lower ends of which form seats for a pair of pivot studs 12 that are mounted in the sides of a lever that coöperates with the vertical standard of the device. This lever is adapted to be entered through the vertical slot between the angle bars 5 and comprises a short generally horizontal arm 13 preferably formed with a seat 14 for the axle 10, and a long downwardly inclined arm 15, which also serves as a brace for the standard 5. This lever is preferably bent to shape from a channel bar, and to the lower end of the arm 15 is attached a sheet-metal anchor plate 16 that is suitably apertured to receive nails or screws indicated at 17 by which it may be strongly secured to the floor 18 of the car, garage, or other structure in which the automobile is stored. To still more securely attach the device to the floor, the foot bar 6 is also preferably apertured to receive nails or screws indicated at 19 in Fig. 2.

To facilitate the application of the device to a car and its attachment to the floor, I preferably employ a link 20 which is pivoted at its upper end at 21 to the arm 15, and at its lower end is formed with a notch 22 by which it is hooked over a cross-pin 23 extending between the vertical angle bars 5 near the lower ends of the latter.

In practice, four of these devices are used for a car, one at each corner. To apply the device, the hook 9 is thrown over the axle and the standard 5 is swung downwardly into the position shown in Fig. 1 in which its foot 6 rests securely on the floor 18. The short arm 13 of the lever member is then entered between the twin members of the standard and beneath the axle, substantially as indicated by dotted lines in Fig. 1. The long arm 15 is then depressed to the position shown by full lines in Fig. 1, whereby the axle is raised sufficiently to lift the tire off the floor, and the hook end of the link 20 is engaged with the pin 23. By means of nails or screws (preferably the latter) the foot piece 6 and the anchor plate 16 are then strongly secured to the floor, and the device is then in full working position. When all four of these devices have been applied to a car, there are then two rearwardly extending braces 15 at the rear end of the car, two forwardly extending braces 15 at the front end of the car and two laterally extending braces 7 on each side of the car. Hence, the car is strongly braced both longitudinally and laterally by this device against any tendency to pitch forwardly, rearwardly, or sidewise under the jolting of the railway car in which the automobile may be transported.

When the device is not in use, the lever member may be removed from the standard, the link 20 folded within the lever arm 15, and the lever and standard laid side by side and thus stored in comparatively small space. The entire device can be made from commercial forms of steel bars at but slight cost, and, of course, can be reused indefinitely, thereby not only providing a much stronger and more secure support and anchor for automobiles in storage or transit, but also effecting a desirable saving of lumber heretofore wasted for this purpose. Manifestly, the specific details of structure may be variously modified without altering the substantial character of the device or sacrificing any of its utilities and advantages. Hence I reserve all such variations and modifications as fall within the spirit and purview of the appended claims.

I claim:

1. An automobile support of the character described, comprising a vertical standard, a lever pivoted on said standard, said lever having a short arm adapted to liftingly engage beneath an axle and a long arm serving as a brace and means for attaching the lower end of said long arm to the floor.

2. An automobile support of the character described, comprising a vertical standard, a lever removably pivoted on said standard, said lever having a short generally horizontal arm adapted to liftingly engage beneath an axle and a long downwardly inclined arm serving as a brace, and an anchor plate on the lower end of said long arm apertured for attachment to the floor.

3. An automobile support of the character described, comprising a vertical standard having at its upper end a hook adapted to engage over an axle, and at its lower end a laterally extending foot member, a lever pivoted on said standard in a plane at right angles to the vertical plane of said foot member, said lever having a short generally horizontal arm adapted to liftingly engage beneath the axle and a long downwardly inclined arm serving as a brace, and an anchor plate on the lower end of said long arm apertured for attachment to the floor.

4. An automobile support of the character described, comprising a pair of spaced vertical angle bars, a horizontal angle bar on which the lower ends of said vertical angle bars are mounted, and a lever pivotally mounted on and extending between said vertical agle bars, said lever having a short generally horizontal arm adapted to liftingly engage beneath an axle and a long downwardly inclined arm constituting a brace and provided at its lower end with means for attachment to the floor.

5. An automobile support of the character described, comprising a pair of spaced vertical angle bars, a horizontal angle bar on which the lower ends of said vertical angle bars are mounted, an inclined brace connecting said vertical and horizontal bars, and a lever formed of a channel bar pivotally mounted on and extending between said vertical angle bars, said lever having a short generally horizontal arm adapted to liftingly engage beneath an axle and a long downwardly inclined arm constituting a brace and provided at its lower end with an apertured anchor plate for attachment to the floor.

6. An automobile support of the character described, comprising a vertical standard, a lever pivoted on said standard and formed with a short generally horizontal arm adapted to liftingly engage beneath an axle and a long downwardly inclined arm constituting a brace and provided at its lower end with means for attaching it to the floor, and a link connecting said long arm and vertical standard, said link being pivotally connected to one of said parts and having a hook engagement with the other.

PHILIP DERROW.